(12) United States Patent
Nishikawa (10) Patent No.: US 6,507,504 B2
(45) Date of Patent: Jan. 14, 2003

(54) METHOD OF CONTROLLING DC/DC CONVERTER FOR REDUCING POWER CONSUMPTION

(75) Inventor: Yukihiro Nishikawa, Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 15 days.

(21) Appl. No.: 09/995,786

(22) Filed: Nov. 29, 2001

(65) Prior Publication Data
US 2002/0071295 A1 Jun. 13, 2002

(30) Foreign Application Priority Data

Dec. 11, 2000 (JP) ........................................ 2000-375909

(51) Int. Cl.⁷ ............................................ H02M 3/335
(52) U.S. Cl. ...................................................... 363/21.15
(58) Field of Search ............................ 363/21.15, 21.12, 363/21.07, 97, 49

(56) References Cited

U.S. PATENT DOCUMENTS 5,063,489 A * 11/1991 Inaba ........................... 323/902
5,222,015 A * 6/1993 Nakagawa ................... 363/131
6,134,123 A * 10/2000 Yamada ..................... 363/21.13

FOREIGN PATENT DOCUMENTS

| JP | 11-215819 | 8/1999 |
| JP | 2000-23458 | 1/2000 |

* cited by examiner

Primary Examiner—Shawn Riley (57) ABSTRACT

A DC/DC converter converts a voltage of a DC power supply to another DC voltage by switching on and off a switching element, which determines an oscillating period and a forced stop period of the switching element based on a comparison signal obtained by comparing an output of an output-voltage detecting and adjusting circuit, which controls the output of the DC/DC converter at a certain voltage, and an output of a triangular-wave generating circuit in a second comparator. The DC/DC converter facilitates confining the pulsation of the output voltage of the DC/DC converter caused by the maximum load in the state of light load including the state of no load, within an allowable range.

9 Claims, 6 Drawing Sheets

Fig. 9 Prior Art 8 first triangular-wave generating circuit
6 detecting and adjusting circuit
23 oscillator circuit

Fig. 10 Prior Art

METHOD OF CONTROLLING DC/DC CONVERTER FOR REDUCING POWER CONSUMPTION

BACKGROUND OF THE INVENTION AND RELATED ART STATEMENT

The present invention relates to a method of controlling a DC/DC converter, which converts a DC input from a DC power supply to an arbitrary DC output through a transformer. Specifically, the present invention relates to a method of controlling a DC/DC converter in the state of light load including the state of no load.

Figure 9:
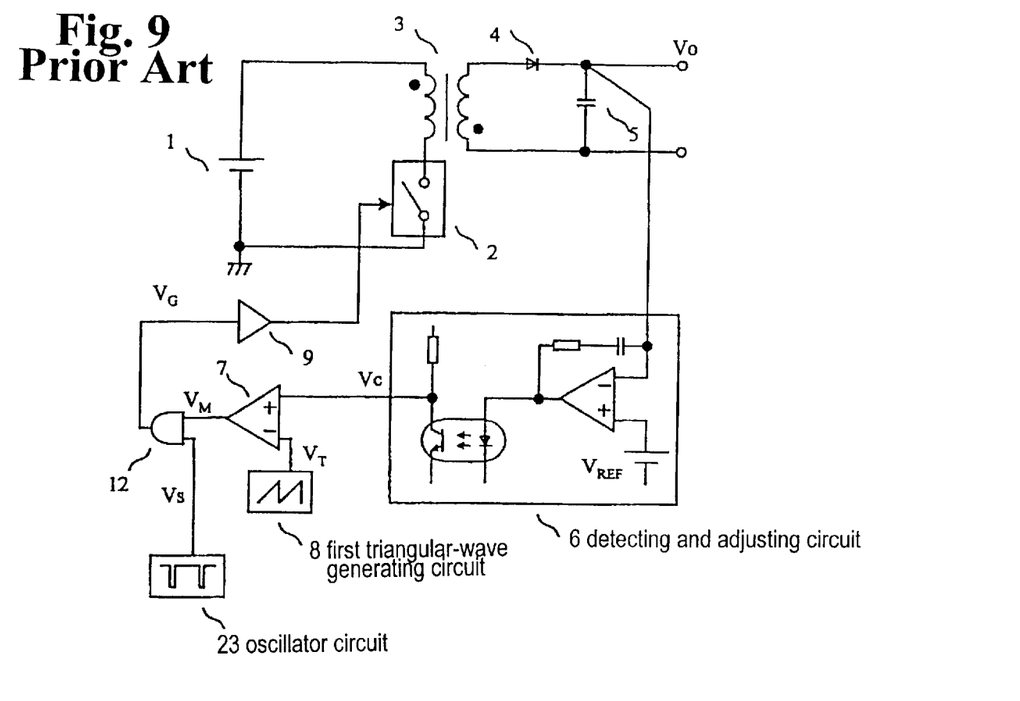
FIG. 9 is a circuit diagram of a conventional DC/DC converter.
Figure 10:
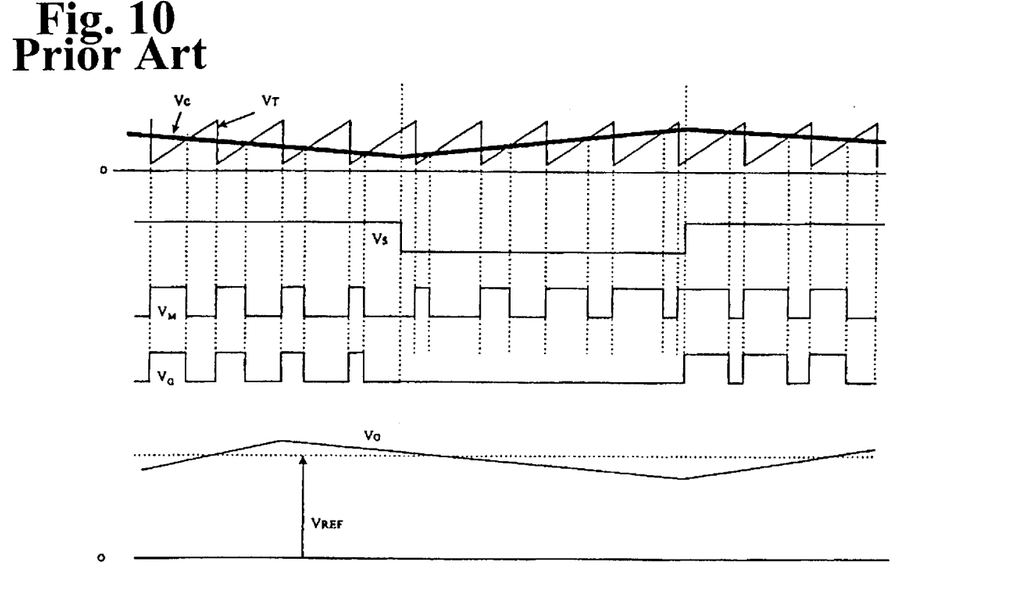
FIG. 10 is a wave chart for explaining the operation of the conventional DC/DC converter of FIG. 9.

FIG. 9 is a circuit diagram of a conventional DC/DC converter. FIG. 10 is a wave chart for explaining the operation of the conventional DC/DC converter of FIG. 9. The conventional DC/DC converter in FIG. 9 is a flyback converter, which modifies the width of the ON-pulses of a switching element 2. In other words, the flyback converter conducts pulse width modulation (PWM) to make the output voltage Vo thereof coincide with a reference voltage $V_{REF}$. A detecting and adjusting circuit 6 for detecting and adjusting the output voltage of the converter outputs a reference voltage Vc. A first triangular-wave generating circuit 8 outputs an output voltage Vr. A first comparator 7 compares the output voltage Vr with the reference voltage $V_{REF}$, and outputs a PWM signal $V_M$. The PWM control switches on the switching element 2 in case of Vc>Vr, and switches off the switching element 2 in case of Vc<Vr.

A rectangular-wave generating circuit (hereinafter referred to as an "oscillator circuit") 23 outputs an output Vs at a fixed frequency and at a fixed duty ratio. A gate drive circuit 9 drives the switching element 2 based on a drive signal $V_G$, which is the logical integration of the PWM signal $V_M$ and the output Vs from the oscillator circuit 23. Therefore, the switching element 2 is driven intermittently such that the switching element 2 repeats switching during the oscillating period when the output Vs from the oscillator circuit 23 is at the high level (H-level), and the switching element 2 is forced to stop switching during the forced stop period when the output Vs from the oscillator circuit 23 is at the low level (L-level).

The forced stop period facilitates decreasing the number of switching per a unit period of time to reduce the switching loss and the conduction loss. However, since no energy is supplied to the output of the flyback converter during the forced stop period, the output voltage from the flyback converter causes pulsation slightly. Therefore, it is necessary to set the oscillating period and the forced stop period appropriately so that the pulsation of the output voltage caused by the maximum load predicted in the state of light load (hereinafter referred to as the "the maximum light load") may be confined within an allowable range.

Since the oscillating period and the forced stop period are controlled at a fixed frequency and a fixed duty ratio in the conventional DC/DC converter shown in FIG. 9, it is necessary to set the oscillating period and the forced stop period appropriately so that the pulsation of the output voltage caused by the maximum light load may be confined within an allowable range. As a result, useless switching is caused more often as the load becomes lighter. As the number of the useless switching increases, the switching loss and conduction loss increase. When the ON-pulse width (ON-period) of the switching element changes abruptly at the changeover timing of the oscillating period and the forced stop period, electrical stress is exerted abruptly to the transformer. When the oscillating frequency of the oscillator circuit 23 is within the audible range, very noisy sounds are caused from the transformer.

In view of the foregoing, it is an object of the invention to provide a DC/DC converter, which facilitates reducing the electric power consumption in the state of light load and preventing very noisy sounds from the transformer.

Further objects and advantages of the invention will be apparent from the following description of the invention.

SUMMARY OF THE INVENTION

According to the invention, there is provided a method of controlling a DC/DC converter, wherein a switching element is switched on and off to convert a voltage supplied from a DC power supply to a constant DC voltage, the method setting an oscillating period and a forced stop period of the switching element in the state of light load including the state of no load to make the switching element work intermittently. The method includes: using an output signal from an output voltage detecting and adjusting circuit, which controls the output of the DC/DC converter at the constant DC voltage, as a first reference signal for determining the on-off timing of the switching element; and using a comparison signal obtained by comparing the first reference signal and a carrier signal of a constant frequency as a control signal for controlling the oscillating period and the forced stop period of the switching element in the state of light load including the state of no load. Advantageously, the carrier signal is a triangular wave or a saw-tooth wave.

Advantageously, the method of controlling the DC/DC converter further includes inputting the first reference signal to an impedance conversion element; using an output from the impedance conversion element as a second reference signal for determining the on-off timing of the switching element; and making the comparison signal lower the second reference signal to control the forced stop period of the switching element. Advantageously, the impedance conversion element is a voltage follower.

Advantageously, the method of controlling the DC/DC converter further includes charging a capacitor at a constant current at a first changeover timing when the forced stop period is changed over to the oscillating period, by using the control signal for controlling the oscillating period and the forced stop period of the switching element; discharging the capacitor at a constant current at a second changeover timing when the oscillating period is changed over to the forced stop period, by using the control signal for controlling the oscillating period and the forced stop period of the switching element; comparing the voltage of the capacitor and the first reference signal with each other; and using smaller one of the voltage of the capacitor and the first reference signal as a new control signal for determining the on-off timing of the switching element.

DETAILED DESCRIPTION OF PREFERRED EMBODIMENTS

Now, the invention will be described in detail hereinafter with reference to the accompanied drawings which illustrate the preferred embodiments of the invention.

Figure 1:
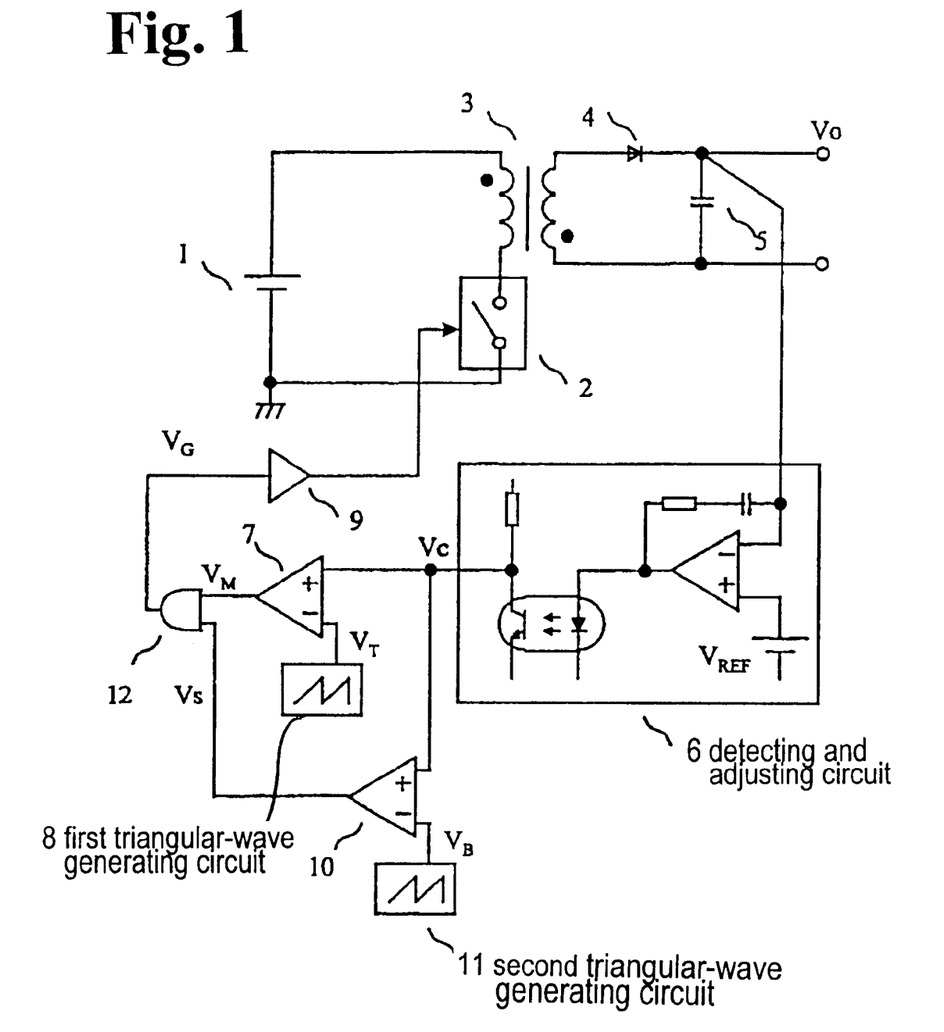
FIG. 1 is a circuit diagram of a DC/DC converter according to the first embodiment of the invention.
Figure 2:
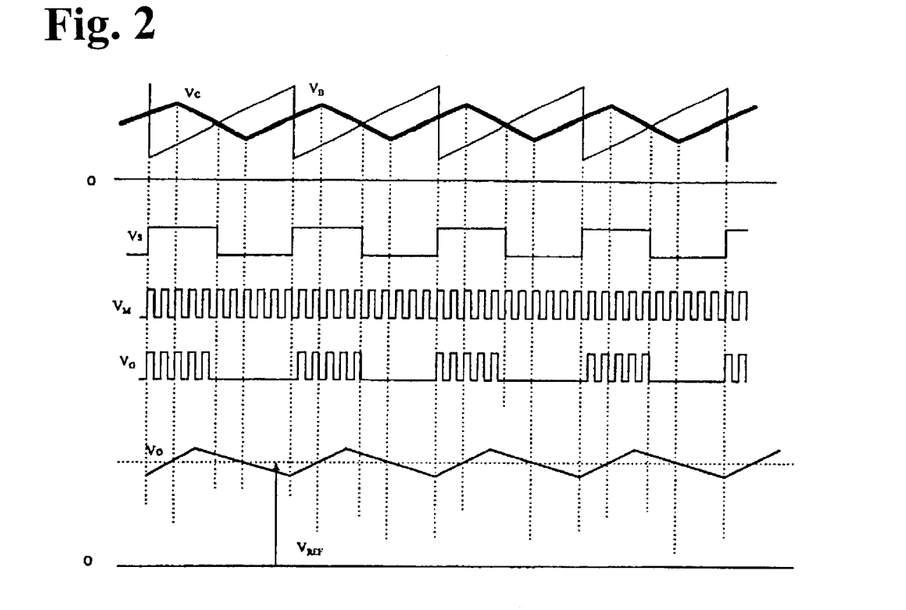
FIG. 2 is a wave chart for explaining the operation of the DC/DC converter of FIG. 1.

FIG. 1 is a circuit diagram of a DC/DC converter according to a first embodiment of the invention. FIG. 2 is a wave chart for explaining the operation of the DC/DC converter of FIG. 1.

Referring now to FIG. 1, the DC/DC converter according to the first embodiment includes a second comparator 10 and a second triangular-wave generating circuit 11 for using the output signal Vc from the detecting and adjusting circuit 6 as a reference input signal inputted to the first comparator 7 to determine the width of the ON-period of the switching element 2 and for controlling the oscillating period and the forced stop period of the switching element 2 based on the magnitude of the load, that is the magnitude of the reference signal Vc. The second comparator 10 compares the reference signal Vc and the output signal $V_B$ from the second triangular-wave generating circuit 11 and outputs a signal Vs for adjusting the oscillating period and the forced stop period of the switching element 2. An AND circuit 12 calculates the logical integration of the signal Vs and the PWM signal $V_M$. Thus, as described in FIG. 2, the switching element 2 is switched on and off when Vs is at the H-level, that is in case of $Vc > V_B$, and the switching element 2 is forced to stop switching when Vs is at the L-level, that is in case of $Vc < V_B$.

Since the reference signal Vc according to the first embodiment becomes smaller more remarkably according to the first embodiment as compared to the prior art as the load is lighter, the oscillating period is shortened. As the oscillating period is shortened, the number of switchings is reduced, and therefore, the switching and conduction loses are reduced. According to the first embodiment, the comparison signal obtained by comparing the reference signal Vc and the triangular signal from the second triangular-wave generating circuit 11 is used as a control signal for adjusting the oscillating period and the forced stop period of the switching element. Alternatively, a saw-teeth-wave and such a carrier wave may be used in substitution for the triangular-wave signal without problem.

Figure 3:
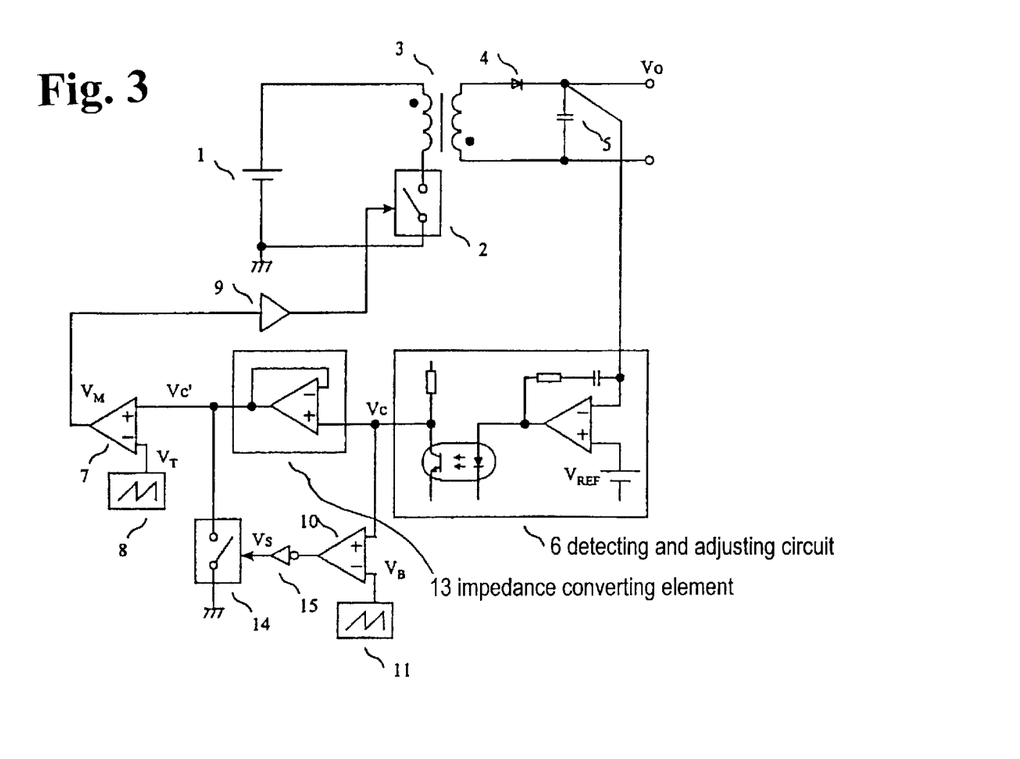
FIG. 3 is a circuit diagram of a DC/DC converter according to the second embodiment of the invention.
Figure 4:
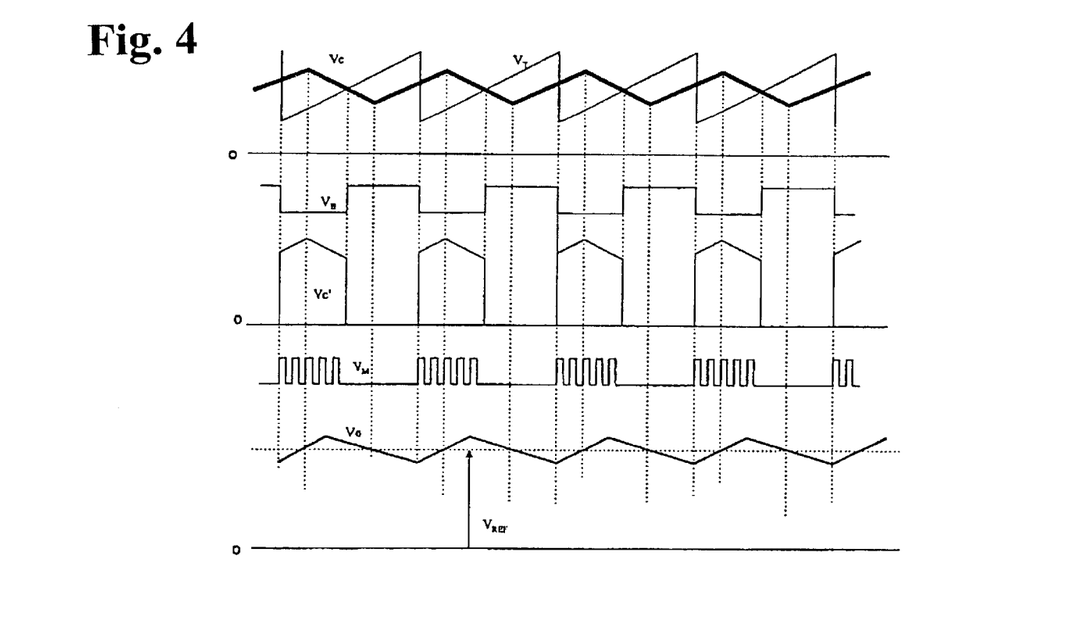
FIG. 4 is a wave chart for explaining the operation of the DC/DC converter of FIG. 3.

FIG. 3 is a circuit diagram of a DC/DC converter according to a second embodiment of the invention. FIG. 4 is a wave chart for explaining the operation of the DC/DC converter of FIG. 3.

Referring now to FIG. 3, the DC/DC converter according to the second embodiment includes an impedance converting element 13. The impedance converting element 13 is a voltage follower or amplifier, which has high input resistance, low output resistance, and voltage gain almost equal to 1. The output signal Vc from the detecting and adjusting circuit 6 is inputted to the impedance converting element 13. The impedance converting element 13 outputs a reference signal Vc' for determining the on-off timing of the switching element. The DC/DC converter according to the second embodiment also includes a second comparator 10 and a second triangular-wave generating circuit 11 for using the output signal Vc from the detecting and adjusting circuit 6 to control the oscillating period and the forced stop period of the switching element 2 based on the magnitude of the load, that is the magnitude of the reference signal Vc. The DC/DC converter according to the second embodiment further includes a NOT circuit 15 and a switching circuit 14. The DC/DC converter according to the second embodiment switches on and off the switching circuit 14 via the NOT circuit 15 based on the comparison signal obtained by comparing the output $V_B$ from the second triangular-wave generating circuit 11 and the reference signal Vc.

When the switching circuit 14 is switched on, the reference signal Vc' is forced to be zero. As a result, the output $V_M$ from the first comparator 7 is at the L-level, resulting in forced stop of the switching element 2. When the switching circuit 14 is switched off, the input signal to the first comparator 7 becomes equal to the reference signal Vc, resulting in an oscillating period, in which the on-off timing of the switching element 2 is controlled by the PWM such that the output voltage from the DC/DC converter is constant (cf. the wave form Vc' in FIG. 4).

Since the oscillating period is shortened more remarkably according to the second embodiment as compared to the prior art as the load is lighter, the number of switchings is reduced, and therefore, the switching and conduction loses are reduced.

Figure 5:
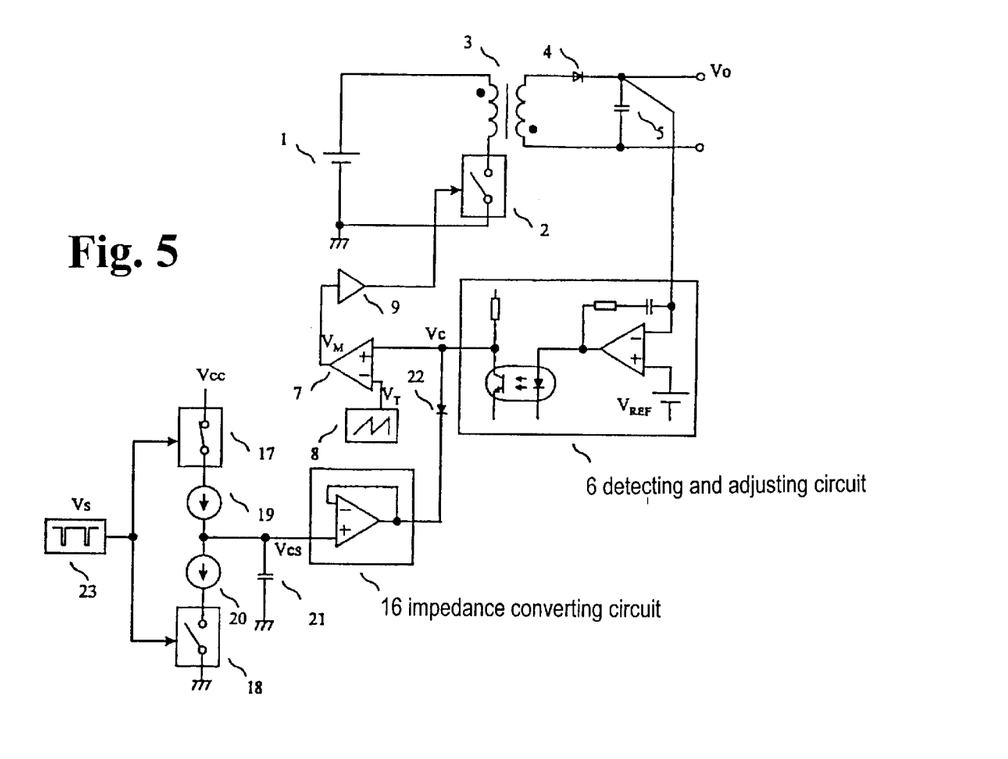
FIG. 5 is a circuit diagram of a DC/DC converter according to the third embodiment of the invention.
Figure 6:
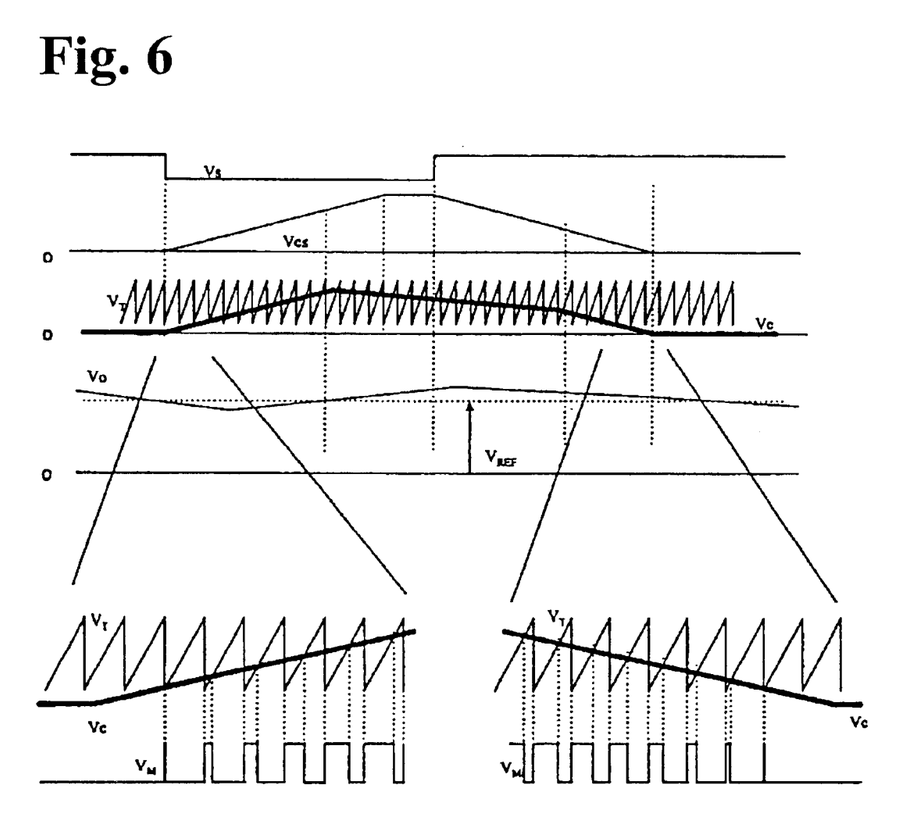
FIG. 6 is a wave chart for explaining the operation of the DC/DC converter of FIG. 5.

FIG. 5 is a circuit diagram of a DC/DC converter according to a third embodiment of the invention. FIG. 6 is a wave chart for explaining the operation of the DC/DC converter of FIG. 5.

Referring now to FIG. 5, the DC/DC converter according to the third embodiment includes a capacitor 21, a second switching circuit 17, a third switching circuit 18, a constant current circuit 19 and a constant current circuit 20. The DC/DC converter according to the third embodiment uses the output Vs from the oscillator circuit 23 for determining the oscillating period and the forced stop period of the switching element 2. The DC/DC converter switches on the second switching circuit, 17 to charge up the capacitor 21 with a constant current via the constant current circuit 19 at the timing of changing over from the forced stop period to the oscillating period such that the voltage of the capacitor 21 rises gradually. The capacitor 21 is charged up to the power supply voltage Vcc connected to the second switching circuit 17. At the timing of changing over from the oscillating period to the forced stop period, the third switching circuit 18 is switched on to discharge the capacitor 21 at a constant current via the constant current circuit 20 such that the voltage of the capacitor 21 lowers gradually. The capacitor 21 is discharged until the voltage thereof becomes zero.

Figure 7:
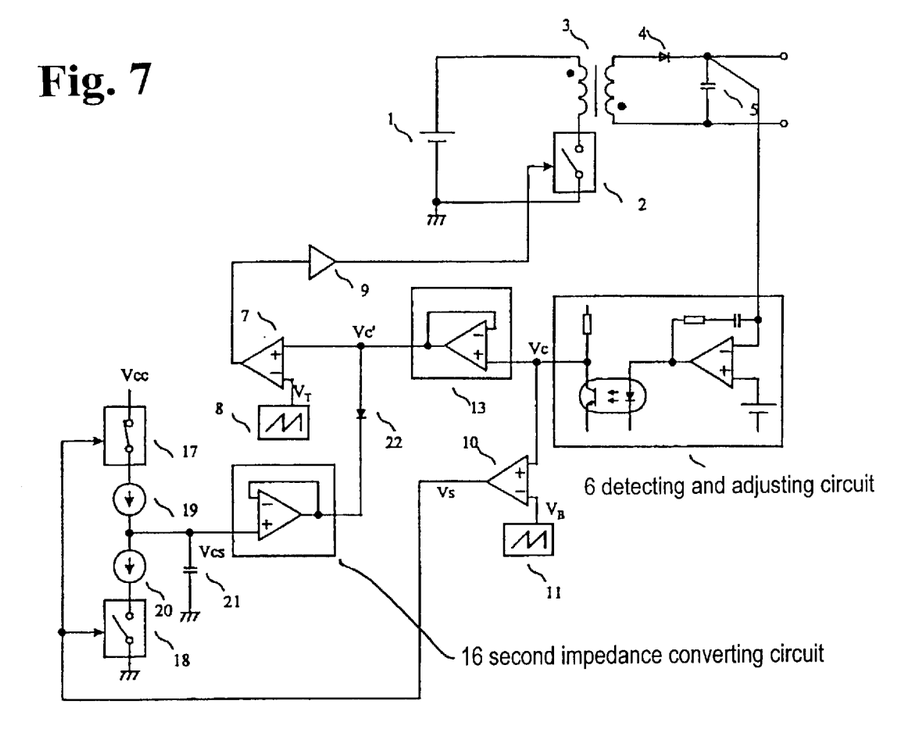
FIG. 7 is a circuit diagram of a DC/DC converter according to the fourth embodiment of the invention.
Figure 8:
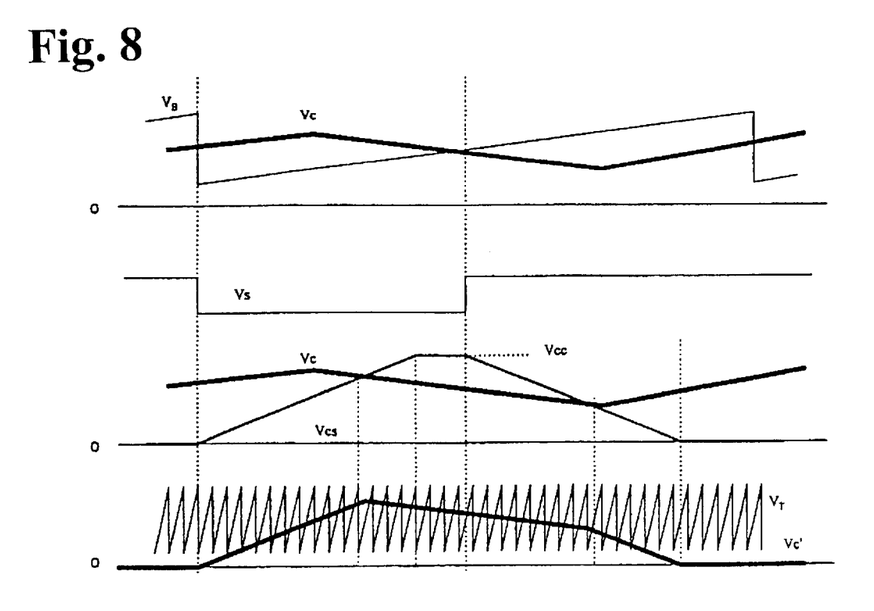
FIG. 8 is a wave chart for explaining the operation of the DC/DC converter of FIG. 7.

The DC/DC converter according to the third embodiment further includes a second impedance converting element 16, and a diode 22. The diode 22 is connected to use a small voltage signal for the input of the first comparator 7 by comparing a voltage equal to the voltage Vcs of the capacitor 21 obtained through the impedance conversion element 16 with an output signal Vc of the detecting and adjusting circuit 6 for the input signal. After the forced stop period is changed over to the oscillating period, the ON-pulse of the switching element 2 is widened gradually at the charging up speed of the capacitor 21 (cf. the wave form of $V_M$ on left hand side of FIG. 6). When the output Vc of the detecting and adjusting circuit 6 is lower than the voltage of the capacitor 21, the on-off timing of the switching element 2 is controlled by the PWM such that the output voltage of the DC/DC converter is constant. After the oscillating period is changed over to the forced stop period, the ON-pulse of the switching element 2 is narrowed gradually at the discharging speed of the capacitor 21 (cf. the wave form of $V_M$ on the right hand side of FIG. 6). When the voltage of the capacitor 21 becomes zero, the switching element 2 is switched off completely. Since the electrical stress exerted at the changeover timing of the oscillating period and the forced stop period to the transformer is reduced, the noises of the transformer are reduced even when the oscillating frequency of the oscillator circuit 23 is within the audible range. 3 FIG. 7 is a circuit diagram of a DC/DC converter according to a fourth embodiment of the invention. FIG. 8 is a wave chart for explaining the operation of the DC/DC converter of FIG. 7. The DC/DC converter according to the fourth embodiment is a modification of the DC/DC converter according to the third embodiment.

The DC/DC converter according to the third embodiment described with reference to FIGS. 5 and 6 employs the output of the oscillator circuit 23 to switch on the switching circuits 17 and 18. The DC/DC converter according to the fourth embodiment employs the output of the second comparator 10 to switch on the switching circuits 17 and 18. In the DC/DC converter according to the fourth embodiment, the second impedance converting element 16 is connected such that the output from the detecting and adjusting circuit 6 does not change even when the input voltage Vc' to the first comparator 7 has changed.

Since the DC/DC converter according to the fourth embodiment facilitates reducing the noises from the transformer and controlling the oscillating period and the forced stop period of the switching element 2 corresponding to the magnitude of the load, the switching and conduction loses are reduced more remarkably as compared to the prior art as the load becomes lighter. The invention is applicable to the DC/DC converters in general which convert a DC voltage to another DC voltage.

The DC/DC converter according to the invention determines the oscillating period and the forced stop period of the switching element in the state of light load including the state of no load based on the reference voltage used to determine the on-off timing of the switching element for controlling the output voltage of the DC/DC converter at a certain value. Therefore, the DC/DC converter according to the invention facilitates shortening the oscillating period more as the load becomes lighter and reducing the switching and conduction loses. Since the DC/DC converter according to the invention elongates the oscillating period even when the load becomes abruptly heavy in the state of light load, output voltage lowering is not caused. Since the DC/DC converter according to the invention facilitates gradually changing the ON-pulse width of the switching element using the signal of charging and discharging the capacitor at a constant current when the oscillating period is changed over to the forced stop period or vice versa, the electrical stress exerted to the transformer is reduced and noises from the transformer are reduced.

Since the DC/DC converter according to the invention facilitates omitting the converter used exclusively in the waiting period, by which the electric power consumption be reduced, an inexpensive electric power supply system is obtained.

While the invention has been explained with reference to the specific embodiments of the invention, the explanation is illustrative and the invention is limited only by the appended claims.

What is claimed is:

1. A method of controlling a DC/DC converter, comprising:

obtaining an output signal from an output voltage detecting and adjusting circuit, which controls an output of the DC/DC converter at a constant DC voltage, to use as a reference signal for determining an on-off timing of a switching element, comparing the reference signal and a first carrier signal of a constant frequency to obtain a first comparison signal, comparing the reference signal and a second carrier signal of a constant frequency to obtain a second comparison signal, providing to the switching element a control signal for controlling an oscillating period and a forced stop period of the switching element in a state of light load including a state of no load, said control signal being obtained from the first comparison signal by comparing the reference signal and the first carrier signal and the second comparison signal to thereby operate the switching element on and off intermittently to convert a voltage supplied from a DC power supply to a constant DC voltage.

2. A method of controlling a DC/DC converter according to claim 1, wherein the carrier signal is a triangular wave or a saw-teeth wave.

3. A method of controlling a DC/DC converter, comprising:

obtaining an output signal from an output voltage detecting and adjusting circuit, which controls an output of the DC/DC converter at a constant DC voltage, to use as a reference signal for determining an on-off timing of a switching element, comparing the reference signal and a first carrier signal of a constant frequency to obtain a first comparison signal, inputting the output signal from the output voltage detecting and adjusting circuit to an impedance conversion element;

obtaining an output from the impedance conversion element as the reference signal for determining the on-off timing of the switching element, said output from the impedance conversion element being lowered with reference to the first comparison signal to control a forced stop period of the switching element, and providing to the switching element a control signal for controlling an oscillating period and the forced stop period of the switching element in a state of light load including a state of no load, said control signal being obtained from a second comparison signal by comparing the output from the impedance conversion element and a second carrier signal of a constant frequency to thereby operate the switching element on and off intermittently to convert a voltage supplied from a DC power supply to a constant DC voltage.

4. A method of controlling a DC/DC converter according to claim 3, wherein said impedance conversion element is a voltage follower.

5. A method of controlling a DC/DC converter, comprising:

obtaining an output signal from an output voltage detecting and adjusting circuit, which controls an output of the DC/DC converter at a constant DC voltage, to use as a reference signal for determining an on-off timing of a switching element, charging a capacitor with a constant current at a first changeover timing when a forced stop period is changed to an oscillating period by using a control signal for controlling the oscillating period and the forced stop period, discharging the capacitor with a constant current at a second changeover timing when the oscillating period is changed to the forced stop period by using the control signal, comparing the voltage of the capacitor and the reference signal with each other and using smaller one of the voltage of the capacitor and the reference signal as a new control signal for determining the on-off timing of the switching element, comparing the new control signal and a carrier signal of a constant frequency, and providing to the switching element a signal for controlling the oscillating period and the forced stop period of the switching element in a state of light load including a state of no load, said signal for the switching element being obtained from a comparison signal by comparing the new control signal and the carrier signal to thereby operate the switching element on and off intermittently to convert a voltage supplied from a DC power supply to a constant DC voltage.

6. A method of controlling a DC/DC converter according to claim 1, wherein said first and second carrier signals are different from each other, and said first and second comparison signals are logically integrated to control the switching element.

7. A method of controlling a DC/DC converter according to claim 3, further comprising a switch connected to the output from the impedance conversion element and operated by an output obtained by comparing the reference signal and the first carrier signal.

8. A method of controlling a DC/DC converter according to claim 5, wherein said capacitor is charged and discharged by operating switches actuated by a circuit.

9. A method of controlling a DC/DC converter according to claim 8, wherein said circuit is connected to the output voltage detecting and adjusting circuit to receive the output signal therefrom.

* * * * *

UNITED STATES PATENT AND TRADEMARK OFFICE
CERTIFICATE OF CORRECTION

PATENT NO. : 6,507,504 B2
DATED : January 14, 2003
INVENTOR(S) : Yukihiro Nishikawa It is certified that error appears in the above-identified patent and that said Letters Patent is hereby corrected as shown below:

<u>Column 4,</u>
Line 45, change "circuit, 17" to -- circuit 17 --; and

<u>Column 5,</u>
Line 16, change "3FIG." to -- FIG. --.

Signed and Sealed this

Twenty-fifth Day of March, 2003

JAMES E. ROGAN
*Director of the United States Patent and Trademark Office*